(12) United States Patent
Bingel et al.

(10) Patent No.: US 11,277,297 B2
(45) Date of Patent: Mar. 15, 2022

(54) METHOD AND APPARATUS FOR MULTIPLE PHYSICAL LAYER INTERFACES WITHIN A SINGLE CONNECTOR

(71) Applicant: Honeywell International Inc., Morris Plains, NJ (US)

(72) Inventors: Thomas Jeffrey Bingel, Indian Rocks Beach, FL (US); Deanne Tran Vo, Palm Harbor, FL (US)

(73) Assignee: Honeywell International Inc., Morris Plains, NJ (US)

( * ) Notice: Subject to any disclaimer, the term of this patent is extended or adjusted under 35 U.S.C. 154(b) by 146 days.

(21) Appl. No.: 16/596,504

(22) Filed: Oct. 8, 2019

(65) Prior Publication Data

US 2021/0105170 A1 Apr. 8, 2021

(51) Int. Cl.
*H04L 29/08* (2006.01)
*H04L 69/323* (2022.01)
*H04L 12/40* (2006.01)

(52) U.S. Cl.
CPC ......... *H04L 29/08018* (2013.01); *H04L 2012/40215* (2013.01)

(58) Field of Classification Search
None
See application file for complete search history.

(56) References Cited

U.S. PATENT DOCUMENTS

| 10,470,279 | B1* | 11/2019 | Fultz | G06F 3/0484 |
| 2011/0196997 | A1* | 8/2011 | Ruberg | G06F 13/4282 |
| | | | | 710/71 |
| 2020/0274731 | A1* | 8/2020 | Antonsson | H04L 12/4625 |
| 2020/0274734 | A1* | 8/2020 | Antonsson | H04L 12/403 |

OTHER PUBLICATIONS

Atmel Radiation-Tolerant 8-bit AVR Microcontroller Datasheet, [online] [retrieved Mar. 6, 2020] retrieved from the Internet URL: https://datasheetspdf.com/datasheet/ATmegaS128.html, 454 pages.
Texas Instruments, SN65HVD3x-EP 3.3-V Full Duplex RS-485 Drivers and Receivers, 2006 [online] [retrieved from the internet Mar. 6, 2020] retrieved from the Internet URL: https://www.google.com/search?q=Texas+Instruments%2C+SN65HVD3x-EP+3.3-V+Full+Duplex+RS-485+Drivers+And+Receivers, 38 pages.

* cited by examiner

*Primary Examiner* — Otis L Thompson, Jr.
(74) *Attorney, Agent, or Firm* — Alston & Bird LLP (57) ABSTRACT

Apparatuses and methods for configuration and operation of data communication connectors supporting connectivity to various physical interfaces are provided.

13 Claims, 4 Drawing Sheets

METHOD AND APPARATUS FOR MULTIPLE PHYSICAL LAYER INTERFACES WITHIN A SINGLE CONNECTOR

TECHNOLOGICAL FIELD

Example embodiments of the present invention relate generally to apparatuses and methods for configuration and operation of data communication connectors supporting connectivity to various physical interfaces.

BACKGROUND

The Open Systems Interconnection model (OSI model) is a conceptual model that characterizes aspects of the communication functions of a telecommunication system. Layer 1, also known as the physical layer, of the OSI model is the layer responsible for the transmission and reception of raw data, for example in the form of bits represented by voltage values, through physical connections to an external data generating/receiving device. Data-communication products utilize specific physical-layer electronics to allow data flow across a single type of standardized interfaces, such as various American National Standards Institute (ANSI)-Telecommunications Industry Association (TIA)/Electronic Industries Alliance (EIA) standard interfaces (ANSI-TIA/EIA interfaces may also be referred as "RS" interfaces), Controller Area Network (CAN) standard interfaces, or the like. These standards may define specific electrical characteristics such as voltage levels, the timing of voltage changes, transmission distances, transmission modes, or the like.

The functionality of a traditional connector is limited to a single interface standard. The interface standard utilized in the physical layer serves as the basis for the entire data communication. Connectivity products are often limited by the physical layer communication interface standard that the product is designed for. For example, a connector designed for communication using the RS-485 standard cannot be used for communication using the CAN standard.

Applicant has identified a number of deficiencies and problems associated with conventional connectivity systems. Through applied effort, ingenuity, and innovation, many of these identified problems have been solved by developing solutions that are included in embodiments of the present disclosure, many examples of which are described in detail herein.

BRIEF SUMMARY

Apparatuses and methods for configuration and operation of data communication connector supporting connectivity to various physical layer interfaces are described herein. The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, an apparatus for providing an electrical communication interface enabling multiple physical layer connection standards is provided. The apparatus includes a first receiver compliant with a first standard defining a first set of physical layer interface circuit electrical characteristics comprising a first standard operating voltage range set. The first receiver is configured to operate within a first receiver operating voltage range set. The apparatus further includes a first driver compliant with the first standard. The first driver is configured to operate within a first driver operating voltage range set. The apparatus further includes a second receiver compliant with a second standard defining a second set of physical layer interface circuit electrical characteristics comprising a second standard operating voltage range set. The second receiver is configured to operate within a second receiver operating voltage range set and the second receiver operating voltage range set overlaps with the first receiver operating voltage range set and the first driver operating voltage range set.

The apparatus further includes a second driver compatible with the second standard. The second driver is configured to operate within a second driver operating voltage range set and the second driver operating voltage range set overlaps with the first receiver operating voltage range set and the first driver operating voltage range set. The apparatus further includes one or more pins connected to the first receiver, the second receiver, the first driver, and the second driver. The one or more pins supports connection with an electronic control unit compliant with at least one of the first standard or the second standard.

In some embodiments, the second standard defining the second set of physical layer interface circuit electrical characteristics is an American National Standards Institute (ANSI) Telecommunications Industry Association (TIA)/Electronic Industries Alliance (EIA) standard.

In some embodiments, the first standard defining the first set of physical layer interface circuit electrical characteristics is a Controller Area Network (CAN) standard.

In some embodiments, the second driver is compliant with a third standard defining a third set of set of physical layer interface circuit electrical characteristics, the second standard is a full-duplex communication standard, and the third standard is compatible with the second standard.

In some embodiments, the third standard defining a third set of physical layer interface circuit electrical characteristics is an American National Standards Institute (ANSI) Telecommunications Industry Association (TIA)/Electronic Industries Alliance (EIA) standard.

In some embodiments, a first pin of the one or more pins is connected to a logical high state input pin of the first receiver, a logical high state input pin of the second receiver, and a logical high state output pin of the first driver.

In some embodiments, a second pin of the one or more pins is connected to a logical low state input pin of the first receiver, a logical low state input pin of the second receiver, and a logical low state output pin of the first driver.

In some embodiments, a second pin of the one or more pins is connected to a logical high state input pin of the second driver and a third pin of the one or more pins is connected to a logical low state input pin of the second driver.

In some embodiments, the apparatus further includes a microcontroller configured to control one or more of: a loopback mode input pin, an enable input pin, or a mode select pin indicating one of a high-speed mode, a low power mode, or a slope control mode.

In some embodiments, the first set of physical layer interface circuit electrical characteristics further comprises: a driver load impedance range, a receiver load impedance range, and a receiver input sensitivity.

In some embodiments, the first standard operating voltage range set comprises a receiver input voltage range and a driver output voltage range.

In some embodiments, the first receiver, the first driver, the second receiver, and the second driver are positioned on one single printed circuit board.

In some embodiments, the first receiver, the first driver, the second receiver, and the second driver are fabricated on an integrated circuit.

In some embodiments, a method for enabling data transfer across a multi-interface physical layer communication connector is provided. The method includes receiving, at a Connection Controller, data from at least one of a plurality of physical layer receivers. The data comprises metadata specifying a data address. The method further includes determining whether the data address satisfies physical layer selection criteria. The method further includes upon determining that the data address satisfies the physical layer selection criteria, configuring the Connection Controller for data transmission via at least one of the plurality of physical layer receivers by configuring one or more non-volatile hardware registers in accordance with the data received from the at least one of the plurality of physical layer receivers based at least in part on configuration data stored within a memory operating in association with the Connection Controller.

In some embodiments, the plurality of physical layer receivers comprises a first receiver compliant with a first standard defining a first set of physical layer interface circuit electrical characteristics comprising a first standard operating voltage range set and a second receiver compliant with a second standard defining a second set of physical layer interface circuit electrical characteristics comprising a second standard operating voltage range set.

In some embodiments, each of the first receiver, first driver, second receiver, and second driver are connected to a connection pin controlled by the one or more non-volatile hardware registers.

In some embodiments, the method further includes setting the one or more non-volatile hardware registers to a default mode before receiving the data from at least one of the plurality of physical layer receivers and upon determining that the data address do not the physical layer selection criteria, processing the data in the default mode.

In some embodiments, configuring the Connection Controller for data transmission via at least the one of the plurality of physical layer receivers by configuring the one or more non-volatile hardware registers in accordance with the data received from the at least one of the plurality of physical layer receivers based at least in part on configuration data stored within the memory operating in association with the Connection Controller includes: determining whether the data matches a first pre-defined value representing a selection of the first standard; upon determining that the data matches the first pre-defined value representing the selection of the first standard, configuring the non-volatile hardware register to select a first operating mode utilizing the first physical layer receiver and the first physical layer driver; upon determining that the data does not match the first pre-defined value representing the selection of the first standard, determining whether the data matches a second pre-defined value representing a selection of the second standard; upon determining that the data matches the second pre-defined value representing the selection of the second standard, configuring the non-volatile hardware register to select a second operating mode utilizing the second physical layer receiver and the second physical layer driver; and upon determining that the data does not match the second pre-defined value representing the selection of the second standard, setting an error flag.

In some embodiments, the second standard defining the second set of physical layer interface circuit electrical characteristics is an American National Standards Institute (ANSI) Telecommunications Industry Association (TIA)/Electronic Industries Alliance (EIA) standard.

In some embodiments, the first standard defining the first set of physical layer interface circuit electrical characteristics is a Controller Area Network (CAN) standard.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Example embodiments provide a connector that supports different communications in accordance with different physical layer interface standards, such as ANSI-TIA/EIA interfaces, CAN interfaces, and/or the like. Example embodiments also enable the configuration and operations of a multiple-physical layer data communications connector in the OSI layer 2 data link layer in a flexible and configurable fashion.

Figure 1:
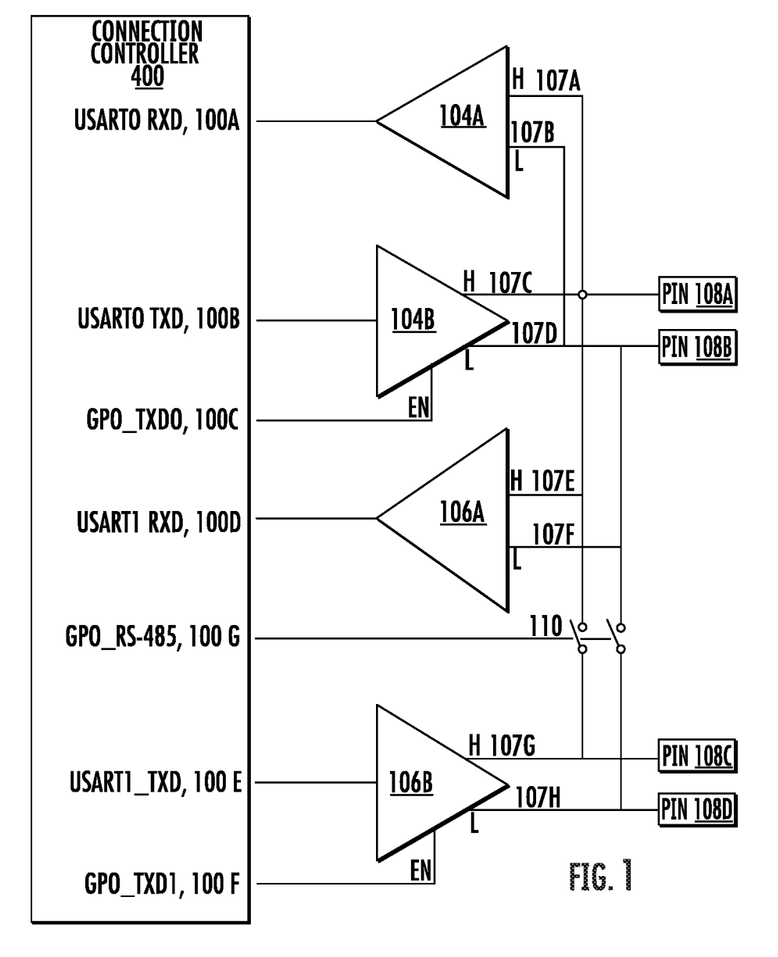
FIG. 1 schematically illustrates an example physical layer connector in accordance with an example embodiment.
Figure 4:
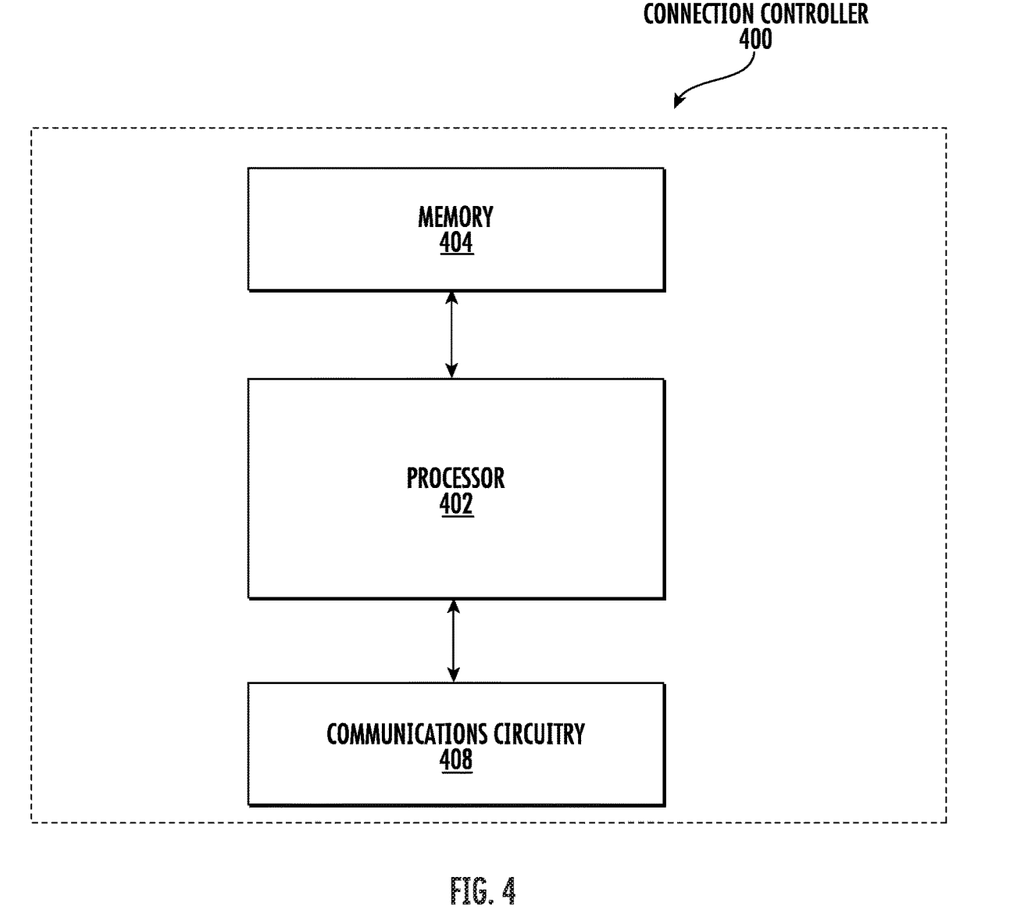
FIG. 4 is a schematic diagram of an example Connection Controller in accordance with an example embodiment.

FIG. 1 illustrates an example physical layer connector in accordance with an example embodiment of the present invention. As illustrated in FIG. 1, various connection pins 100A-100G of a Connection Controller 400 are connected to the physical layer connector to control the physical layer connector. In some embodiments, the Connection controller 400 may include a microcontroller, as shown in FIG. 4. The microcontroller may be a complementary metal-oxide-semiconductor (CMOS) embedded with non-volatile memory segments and one or more connection pins enabling input/output, including the connection pins 100A-100G.

In some embodiments, each of the connection pins 100A-100G may be an input/output port physically embedded on the Connection Controller 400.

In some embodiments, the first receiver 104A, first driver 104B, second receiver 106A, and second driver 106B may be connected to one or more connection pins 108A-108B which enables connection to a device (e.g., a data generating/receiving device) that communicates with the physical layer connector, such as an electronic control unit (ECU).

In some embodiments, the first receiver is compliant with a first standard defining a first set of physical layer interface circuit electrical characteristics. The first driver may also be compliant with the first standard. The first set of physical layer interface circuit electrical characteristics may comprise a first standard operating voltage range set that includes a receiver input voltage range, a driver output voltage range, a maximum allowed voltage, a transfer type indicating full duplex or half duplex, a logical high state voltage range (representing a 1), a logical low state voltage range (representing a 0), an uncertainty zone voltage range, a receiver input sensitivity, or the like. In some embodiments, the first standard also defines a physical distance of data transmission. In some embodiments, the first standard is the Controller Area Network (CAN) standard. In some embodiments, the first receiver and the first driver may be provided on the same circuit unit 104.

In some embodiments, the first receiver and the first driver may operate in accordance with a set of electrical characteristics including an operating voltage range set and switching characteristics. In some embodiments, the set of electrical characteristics and switching characteristics comprises one or more of: a supply voltage, a signaling rate, a logical high state input voltage range, a logical low state input voltage range, a differential input voltage range, a logical high state output current range, a logical low state output current range, a input clamp voltage range, a steady-state differential output voltage, a overshoot voltage range, a undershoot voltage range, one or more output voltage ranges in various states and modes of operation, various switching parameters such as propagation delay time ranges, differential output signal rise and fall time ranges, pulse skew time range, enable input clamp voltage, or the like.

In some embodiments, the second receiver is compliant with a second standard defining a second set of physical layer interface circuit electrical characteristics. The second set of physical layer interface circuit electrical characteristics may comprise a second standard operating voltage range set that includes a receiver input voltage range, a driver output voltage range, a maximum allowed voltage, a transfer type indicating full duplex or half duplex, a logical high state voltage range, a logical low state voltage range, an uncertainty zone voltage range, a receiver input sensitivity, or the like. In some embodiments, the second standard also defines a physical distance of data transmission. In some embodiments, the second standard is an ANSI-TIA/EIA standard, such as the ANSI-TIA/EIA 422, also known as RS-422.

In some embodiments, the second driver is also compliant with the second standard. In some embodiments, the second driver is compliant with a third standard compatible with the second standard. For example, the second driver may be designed for usage in accordance with the third standard and may be compatible to communicate with other components compliant with the second standard. In some embodiments, the third standard is the ANSI-TIA/EIA 485 standard, also known as RS-485. In some embodiments, the second driver and the second receiver may be on the same circuit unit 106. Moreover, in certain embodiments, the circuit unit 104 of the first receiver 104A and first driver 104B and the circuit unit 106 of the second receiver 106A and 106B may be embodied on the same circuit unit (e.g., on the same printed circuit board (PCB)). In some embodiments, an external device connected with the connector, such as an ECU, is compatible with one or more of the first standard, the second standard, or the third standard. In some embodiments, the ECU is only compatible with one of the first standard or the second standard.

In some embodiments, the first operating voltage range set overlaps with the second operating voltage range set. The first operating range set overlaps with the second operating voltage range set if: for each corresponding voltage range in the first operating range set and the second operating voltage range set, there is a voltage value that falls within both the voltage range in the first operating range set and the voltage range in the second operating range set. For example, if the first operating voltage range set includes a logical high state voltage range defining that a voltage between 3 volts to 5 volts represents a logical high state and the second operating voltage range set includes a logical high state voltage range defining that a voltage between 3 volts to 12 volts represents a logical high state, there is a voltage value that falls within a logical high state voltage range for the first operating voltage range set and the second operating voltage range set. It will be appreciated that a third operating voltage range set may also overlap with the first and the second operating voltage range set if the above-stated conditions are true for the third operating voltage range set.

In some embodiments, the first operating voltage range set and the second operating voltage range set each includes at least a logical high state voltage range and a logical low state voltage range.

In some embodiments, the second driver and the second receiver may operate in accordance with a set of electrical characteristics including an operating voltage range set and switching characteristics. In some embodiments, the set of electrical characteristics and switching characteristics comprises one or more of: a supply voltage, a signaling rate, a logical high state input voltage range, a logical low state input voltage range, a differential input voltage, a logical high state output current range, a logical low state output current range, a input clamp voltage range, a steady-state differential output voltage, an overshoot voltage range, an undershoot voltage range, one or more output voltage ranges in various states and modes, various switching parameters such as propagation delay time ranges, differential output signal rise and fall time ranges, pulse skew time range, enable input clamp voltage, or the like.

Each of the first receiver 104A and the second receiver 106A may have a logical high state (representing a 1) input pin 107A/107E and a logical low state (representing a 0) input pin 107B/107F. Each of the first driver 104B and the second driver 106B may have a logical high state output pin 107C/107G and a logical low state output pin 107D/107H. The logical high/logical low state input pins and the logical high/logical low state output pins may be connected to one or more pins of the connector 108A to 108D. In some embodiments, pin 108A is connected to the logical high state input pin 107A of the first receiver 104A, the logical high state input pin 107E of the second receiver 106A, and the logical high state output pin 107C of the first driver 104B. In some embodiments, pin 108B is connected to the logical low state input pin 107B of the first receiver 104A, the logical low state input pin 107F of the second receiver 106A, and the logical low state output pin 107D of the first driver 104B. In some embodiments, pin 108C and 108D are connected to the logical high/logical low state output pins 107G/107H of the driver 106B respectively.

The Connection Controller 400 is configured to process data received from the receivers and provide data to be transmitted by the drivers via, for example industry known USART (Universal Synchronous/Asynchronous Receiver/Transmitter) devices. The Connection Controller 400 may provide various inputs to the drivers and receivers, to enable drivers from a high-impedance mode to a low-impedance driving mode; such as signal 100C controls driver 104 B output impedance, and signal 100F controls driver 106B output impedance.

In some embodiments where the first receiver 104A and the first driver 104B are compliant with a first standard, the second receiver 106A is compliant with a second standard, and the second driver 106B is compliant with a third standard compatible with the second standard, three operating modes detailed below may be provided.

In some embodiments, the first operating mode operates in accordance with the CAN standard. In some embodiments, the second operating mode operates in accordance with the ANSI-TIA/EIA 422 standard. In some embodiments, the third operating mode operates in accordance with the ANSI-TIA/EIA 485 standard. Each of the first operating mode, second operating mode, and third operating mode defines modes of operation of one or more of the first receiver, first driver, second receiver, and second driver. In some embodiments, receiver 104A may be benign to the operation of receiver 106A operation. Benign receiver 104A means having a high impedance over the frequency range and voltage range ascribed to the operating mode of receiver 106A. Likewise, in some embodiments, receiver 106A may be benign to the operation of receiver 104A operation. Benign receiver 106A means having a high impedance over the frequency range and voltage range ascribed to the operating mode of receiver 104A. A benign high impedance is compared to the characteristic impedance of the physical communication bus, by way of example, 100 Ohms, or the matched-bus terminating impedance, by way of example, 100 Ohms. In some embodiments, benign receiver impedance is made to be a portion of the terminating impedance. Similarly, driver 104B or 106B are implemented to actively or passively terminate the bus in some embodiments. Example means of terminating the bus consists of a 100 Ohm resistor or a network of passive components.

In some embodiments, the connection pin 100G is connected to one or more digital-controlled analog switches 110. In some embodiments, when GPO-RS-485 is set on high, the digital-controlled analog switches 110 are closed and the connection pins 108A and 108B are connected to the driver 106B. In some embodiments, when GPO-RS-485 is set on low, the digital-controlled analog switches 110 are open and the connection pins 108A and 108B are not connected to the driver 106B. The digital-controlled analog switches 1110 control whether the connection pins 108A and 108B are connected to the driver 106B via pins 107G/107H. In some alternative embodiments, connection pin 100G and digital-controlled analog switches 110 are not implemented on the physical layer connector and pins 108A and 108B are not connected to the driver 106B.

Figure 2:
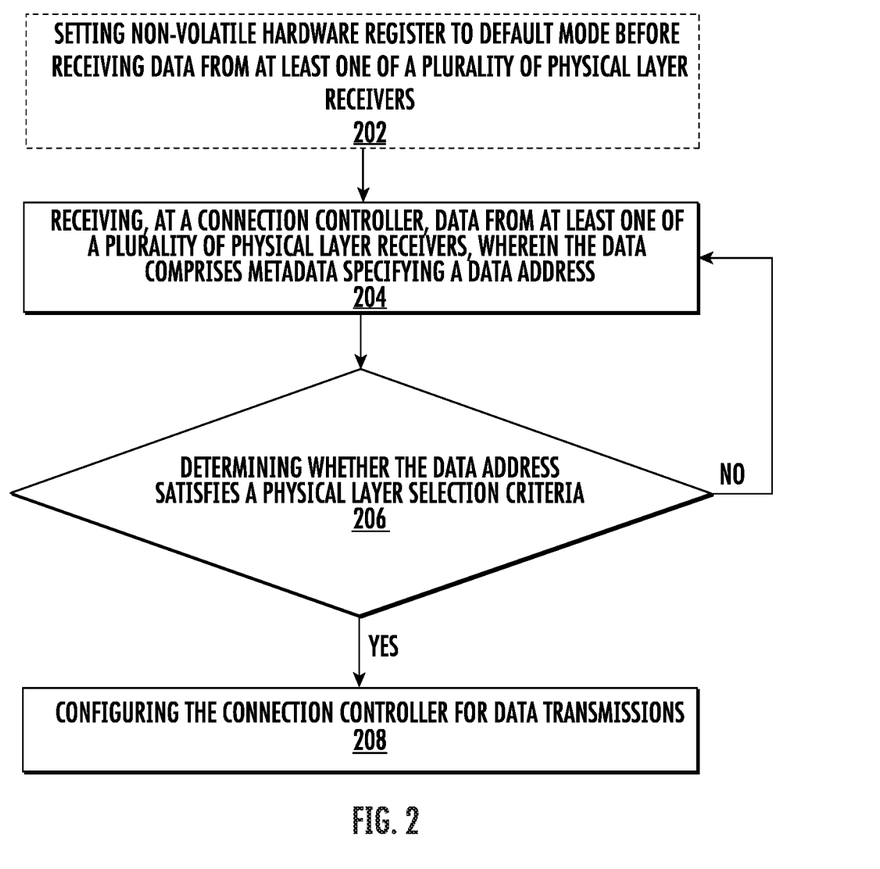
FIG. 2 is a flowchart illustrating an example method of enabling data transfer across a multi-interface physical layer communication connector in accordance with an example embodiment.

FIG. 2 is a flowchart illustrating an example method of enabling data transfer across a multi-interface physical layer communication connector in accordance with an example embodiment. As illustrated in block 202 of FIG. 2, the connector sets one or more non-volatile hardware registers to a default mode before receiving data from at least one of a plurality of physical layer receivers physically connected to the computing system. In some embodiments, the Connection Controller may be connected to the plurality of physical layer receivers as illustrated in FIG. 1. In some embodiments, default mode defines modes of operation of each of the plurality of physical layer receivers and optionally modes of operation of each of a plurality of physical layer drivers. In some embodiments, the non-volatile hardware registers are input/output registers embedded on the connector. In some embodiments, each non-volatile hardware register may be associated with a register name, an input/output address, and a static random-access memory address.

As illustrated in block 204, the Connection Controller 400 includes one or more connection pins for receiving data from at least one of the plurality of physical layer receivers. The data comprises metadata specifying a data address. Different pins may be utilized depending on which one of the plurality of physical layer receivers are enabled for receiving data.

As illustrated in block 206, the Connection Controller 400 is configured for determining whether the data address satisfies physical layer selection criteria. In some embodiments, the physical layer selection criteria may be one or more values representing a data address pre-stored on non-volatile hardware memory on the Connection Controller. The physical layer selection criteria are determined to be satisfied if the data address of the received data matches one of the one or more pre-stored values.

As illustrated in block 208, the Connection Controller 400 self-configures its own operation, and configures the plurality of physical layer receivers/drivers for data transmission via at least one of the plurality of physical layer receivers in accordance with the data received from the at least one of the plurality of physical layer receivers. In some embodiments, the Connection Controller 400 utilizes configuration data corresponding to a physical layer selection criteria for self-configuration and/or configuration of the plurality of physical layer receivers/drivers. The configuration data of some embodiments is stored within a non-volatile hardware memory operating in association with the Connection Controller. For example, upon determining that the data address satisfies a physical layer selection criteria, the Connection Controller utilizes one or more non-volatilize registers to configure the Connection Controller 400 and/or the plurality of physical layer receivers/drivers to operate in accordance with a selected operating mode. As a specific example, the configuration data may be utilized to change the operating mode of the Connection Controller from a default operating mode to a non-default operating mode. More specifically, in some embodiments, if the default operating mode is a first receiver in the plurality of receivers is enabled, then the configuration data may be utilized to change the operating mode of the Connection Controller 400 to disable the first receiver and enable a second receiver of a plurality of receivers, such as an operating mode detailed in the table below:

| | CAN Mode | RS-422 Mode | RS-485 Mode |
|---|---|---|---|
| Pins 108 used | A, B | A, B or C, D | A, B or C, D |
| GPO_TXD0 output | high | low | low |
| GPO_TXD1 output | low | high | high |
| GPO_RS-485 output | low | low | high |
| TX USART output | 0 | 1 | 1 |
| RX USART output | 0 | 1 | 1 |

In some embodiments, upon determining that the data address does not satisfy the physical layer selection criteria, the Connection Controller 400 may process the received data in accordance with the default mode and continues to process data. Details regarding configuring the Connection Controller for data transmission is further illustrated in FIG. 3.

In some embodiments, the one or more non-volatile hardware registers may configure at least a first physical layer receiver, a second physical layer receiver, a first physical layer driver, and a second physical layer driver. In some embodiments, the first physical layer receiver, second physical layer receiver, first physical layer driver, and second physical layer driver are positioned on a single printed circuit board or embedded in an integrated circuit. In some embodiments, the first receiver is compliant with a first standard defining a first set of physical layer interface circuit electrical characteristics comprising a first standard operating voltage range set and the second receiver is compliant with a second standard defining a second set of physical layer interface circuit electrical characteristics comprising a second standard operating voltage range set. In some embodiments, the first standard defining the first set of physical layer interface circuit electrical characteristics is a CAN standard. In some embodiments, the second standard defining the second set of physical layer interface circuit electrical characteristics is an ANSI-TIA/EIA standard. Such as ANSI-TIA/EIA 485/422.

Figure 3:
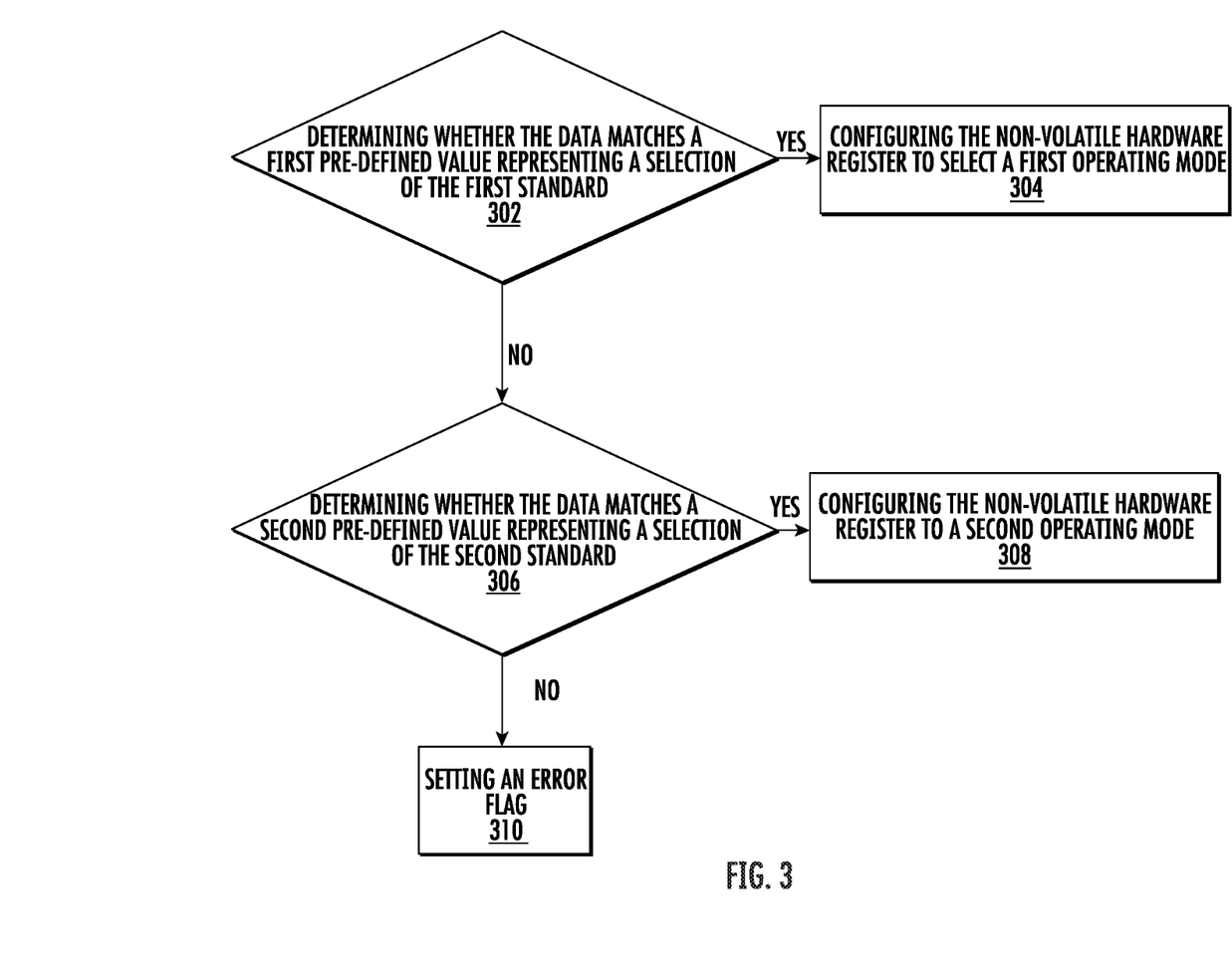
FIG. 3 is another flowchart illustrating an example method of enabling data transfer across a multi-interface physical layer communication connector in accordance with an example embodiment.

FIG. 3 is another flowchart illustrating an example method of enabling data transfer across a multi-interface physical layer communication connector in accordance with an example embodiment.

As illustrated in block 302, the Connection Controller 400 is configured to determine whether the data matches a first pre-defined value representing a selection of the first standard. The first pre-defined value may be stored on the non-volatile hardware memory in the Connection Controller 400. In some embodiments, the Connection Controller 400 may determine whether the data matches a first pre-defined value representing a selection of the first standard by comparing the data received with the pre-defined value stored on the non-volatile hardware memory in the Connection Controller.

As illustrated in block 304, the Connection Controller 400 further configures the non-volatile hardware registers to select a first operating mode utilizing the first physical layer receiver (and/or the first physical layer driver) upon determining that the data matches the first pre-defined value representing the selection of the first standard. In some embodiments, the Connection Controller 400 may select the first physical layer receiver and/or the first physical layer driver by providing voltage/current to an enabling pin and/or another pin of the first physical layer receiver and/or the first physical layer driver. In some embodiments, the first operating mode is an operating mode that operates in accordance with the CAN standard.

As illustrated in block 306, the Connection Controller 400 is configured to determine whether the data matches a second pre-defined value representing a selection of the second standard upon determining that the data does not match the first pre-defined value representing the selection of the first standard.

As illustrated in block 308, the Connection Controller 400 configures the non-volatile hardware registers to select a second operating mode utilizing the second physical layer receiver and the second physical layer driver upon determining that the data matches the second pre-defined value representing the selection of the second standard. In some embodiments, the Connection Controller 400 may select a second operating mode utilizing the second physical layer receiver and/or the second physical layer driver by providing voltage/current to an enabling pin and/or another pin of the second physical layer receiver and/or the second physical layer driver. In some embodiments, a voltage/current above a threshold preconfigured and hardwired in the second physical layer receiver/second physical layer driver represents enabling the second physical layer receiver/second physical layer driver and a voltage/current below a threshold preconfigured and hardwired in the second physical layer receiver/second physical layer driver represents disabling the second physical layer receiver/second physical layer driver. In some embodiments, the second operating mode is an operating mode that operates in accordance with the ANSI-TIA/EIA 485/422 standard.

As illustrated in block 310, the Connection Controller 400 is configured to set an error flag upon determining that the data does not match the second pre-defined value representing the selection of the second standard due to potential errors in transmission.

An example Connection Controller 400 is illustrated in FIG. 4. As depicted in FIG. 4, the apparatus 400 includes processor 402, memory 404, communications circuitry such as USART and GPO (general purpose outputs), within and comprising Connection Controller 400. Although these components 402-408 are described with respect to functional limitations, the particular implementations necessarily include the use of particular hardware. It should also be understood that certain of these components 402-408 may include similar or common hardware. For example, two sets of circuitries may both leverage use of the same processor, storage medium, or the like to perform their associated functions, such that duplicate hardware is not required for each set of circuitries.

In one embodiment, the processor 402 may be in communication with the memory 404. The memory 404 is non-transitory and may include, for example, one or more volatile and/or non-volatile memories. The memory 404 may be configured to store information, data, or the like for enabling the Connection Controller to carry out various functions in accordance with example embodiments of the present disclosure. In some embodiments, the memory 404 include the one or more non-volatile hardware registers (which may include input/output registers) physically located within the processor 402 previously described. In some embodiments, the memory 404 includes a static random-access memory. In some embodiments, the memory 404 includes a flash program memory.

The processor 402 may be embodied in a number of different ways. In some embodiments, the processor 402 may be configured to execute instructions stored in the memory 404 or otherwise accessible to the processor 402. In some embodiments, the processor 402 may be configured to execute hard-coded functionalities. As such, if configured by hardware or software methods, or by a combination thereof, the processor 402 may represent an entity (e.g., physically embodied in circuitry) capable of performing operations according to an embodiment of the present disclosure while configured accordingly.

The Connection Controller 400 may be any means such as a device or circuitry embodied to enable communication with a separate circuit unit, such as one or more connection pins physically located on the processor 402.

Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. Moreover, the separation of various system components in the embodiments described above should not be understood as requiring such separation in all embodiments.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for providing an electrical communication interface enabling multiple physical layer connection standards, comprising:
a first receiver compliant with a first standard defining a first set of physical layer interface circuit electrical characteristics comprising a first standard operating voltage range set, wherein the first receiver is configured to operate within a first receiver operating voltage range set;
a first driver compliant with the first standard, wherein the first driver is configured to operate within a first driver operating voltage range set;
a second receiver compliant with a second standard defining a second set of physical layer interface circuit electrical characteristics comprising a second standard operating voltage range set, wherein the second receiver is configured to operate within a second receiver operating voltage range set, and wherein the second receiver operating voltage range set overlaps with the first receiver operating voltage range set and the first driver operating voltage range set;
a second driver compatible with the second standard, wherein the second driver is configured to operate within a second driver operating voltage range set, and wherein the second driver operating voltage range set overlaps with the first receiver operating voltage range set and the first driver operating voltage range set; and
one or more pins connected to the first receiver, the second receiver, the first driver, and the second driver, wherein the one or more pins supports connection with an electronic control unit compliant with at least one of the first standard or the second standard.

2. The apparatus of claim 1, wherein the second standard defining the second set of physical layer interface circuit electrical characteristics is an American National Standards Institute (ANSI) Telecommunications Industry Association (TIA)/Electronic Industries Alliance (EIA) standard.

3. The apparatus of claim 1, wherein the first standard defining the first set of physical layer interface circuit electrical characteristics is a Controller Area Network (CAN) standard.

4. The apparatus of claim 1, wherein the second driver is compliant with a third standard defining a third set of set of physical layer interface circuit electrical characteristics, wherein the second standard is a full-duplex communication standard, and wherein the third standard is compatible with the second standard.

5. The apparatus of claim 1, wherein the third standard defining a third set of physical layer interface circuit electrical characteristics is an American National Standards Institute (ANSI) Telecommunications Industry Association (TIA)/Electronic Industries Alliance (EIA) standard.

6. The apparatus of claim 1, wherein a first pin of the one or more pins is connected to a logical high state input pin of the first receiver, a logical high state input pin of the second receiver, and a logical high state output pin of the first driver.

7. The apparatus of claim 1, wherein a second pin of the one or more pins is connected to a logical low state input pin of the first receiver, a logical low state input pin of the second receiver, and a logical low state output pin of the first driver.

8. The apparatus of claim 1, wherein a second pin of the one or more pins is connected to a logical high state input pin of the second driver and a third pin of the one or more pins is connected to a logical low state input pin of the second driver.

9. The apparatus of claim 1, further comprising a microcontroller configured to control one or more of: a loopback mode input pin, an enable input pin, or a mode select pin indicating one of a high-speed mode, a low power mode, or a slope control mode.

10. The apparatus of claim 1, wherein the first set of physical layer interface circuit electrical characteristics further comprises: a driver load impedance range, a receiver load impedance range, and a receiver input sensitivity.

11. The apparatus of claim 1, wherein the first standard operating voltage range set comprises a receiver input voltage range and a driver output voltage range.

12. The apparatus of claim 1, wherein the first receiver, the first driver, the second receiver, and the second driver are positioned on one single printed circuit board.

13. The apparatus of claim 1, wherein the first receiver, the first driver, the second receiver, and the second driver are fabricated on an integrated circuit.

* * * * *